UNITED STATES PATENT OFFICE.

ALBERT MANVEL, OF ELIZABETHPORT, NEW JERSEY.

IMPROVEMENT IN THE MANUFACTURE OF MALLEABLE IRON.

Specification forming part of Letters Patent No. 43,595, dated July 19, 1864.

*To all whom it may concern:*

Be it known that I, ALBERT MANVEL, of Elizabethport, in the county of Union and State of New Jersey, have invented a new and useful Improvement in the Manufacture of Malleable Iron; and I do hereby declare that the following is a full, clear, and exact description of the same.

The usual process for converting small articles of cast-iron into malleable iron is effected by subjecting said articles to red heat continued for several days while they are buried in oxide of iron, which may be either scales of iron-rust or pulverized specular iron ore. The oxide gradually yields its oxygen or a portion of its oxygen to the carbon of the cast-iron, and this is rendered malleable. The scales of iron-rust or other material, as the same become deoxidized, prevent the contact of fresh portions of oxide with the cast-iron, and the operation is consequently impeded.

The object of this present invention is to facilitate the decarbonizing process of the cast-iron and shorten the time required to reduce the same to a malleable state.

The invention consists in the employment or use, in combination with the iron scales or oxide of iron, of a small quantity of oil of vitriol or diluted sulphuric acid in such a manner that by the action of the sulphuric acid, when the same comes in contact with red-hot iron in presence of water, said water and a portion of the acid are decomposed, forming sulphureted hydrogen, which passes off in a gaseous state, and the oxygen evolved by this decomposition combines with a portion of the carbon of the cast-iron and reduces the same to malleable iron.

The proportion in which I mix my deoxidizing agents together is about as follows: scales of iron-rust, fifty parts; oil of vitriol, one part, by weight, the oil of vitriol being of the density of 1.558 or 52° Baumé. This proportion, however, will be modified, according to the nature of the scales and to the density of the oil of vitriol, and it has to be determined in each case by actual experiments.

I do not wish to confine myself to any particular proportion in using the iron scales and oil of vitriol; but I reserve the right to change this proportion as circumstances may demand. Neither do I wish to confine myself to the use of iron scales, since pulverized specular ore or other similar oxide of iron can be used with the same effect.

I claim as new and desire to secure by Letters Patent—

The use of oil of vitriol or hydrated sulphuric acid in combination with iron scales or other equivalent material, substantially as herein described, to act as decarbonizing agents in the manufacture of malleable iron.

ALBERT MANVEL.

Witnesses:
 THEO. TUSCH,
 M. M. LIVINGSTON.